United States Patent [19]

Taguchi et al.

[11] Patent Number: 4,643,842

[45] Date of Patent: Feb. 17, 1987

[54] LIQUID CRYSTAL COMPOSITION

[75] Inventors: Masaaki Taguchi, Tokyo; Hitoshi Suenaga, Hyogo, both of Japan

[73] Assignees: Seiko Instruments & Electronics Ltd., Tokyo; Teikoku Chemical Industry Co., Ltd., Osaka, both of Japan

[21] Appl. No.: 716,956

[22] Filed: Mar. 28, 1985

[30] Foreign Application Priority Data

Mar. 28, 1984 [JP] Japan .................. 59-60342

[51] Int. Cl.⁴ .................. C09K 19/46; C09K 19/48
[52] U.S. Cl. .................. 252/299.67; 252/299.68; 252/299.65; 350/350 S
[58] Field of Search .................. 252/299.67, 299.65, 252/299.68; 560/61, 73, 102, 106, 107, 108, 109; 350/350 S

[56] References Cited

U.S. PATENT DOCUMENTS

| | | | |
|---|---|---|---|
| 3,975,286 | 8/1976 | Oh .................. | 252/299 |
| 4,083,797 | 4/1978 | Oh .................. | 252/299 |
| 4,149,413 | 4/1979 | Gray et al. .................. | 73/356 |
| 4,257,911 | 3/1981 | Gray et al. .................. | 252/299 |

FOREIGN PATENT DOCUMENTS

| | | |
|---|---|---|
| 0110299 | 6/1984 | European Pat. Off. . |
| 0115693 | 8/1984 | European Pat. Off. . |
| 0136725 | 10/1985 | European Pat. Off. . |
| 53-044535 | 4/1978 | Japan . |

OTHER PUBLICATIONS

Aliev, et al, *Chemical Abstracts*, vol. 96, 1982, 133710.
Loseva, et al, *Chemical Abstracts*, vol. 93, 1980, 86116.
Goodby & Leslie, *Liquid Crystals & Ordered Fluids*, vol. 4, 1984, pp. 1-32.
Arutyunyan, et al, *Chemical Abstracts*, vol. 95, 1981, 104173.
Li, et al., *Chemical Abstracts*, vol. 94, 1981, 191853.
Gray & McDonnell, *Mol. Cryst. Liq. Cryst.*, vol. 34 (Letters), 1977, pp. 211-217.

*Primary Examiner*—Teddy S. Gron
*Assistant Examiner*—Jack Thomas
*Attorney, Agent, or Firm*—Robert E. Burns; Emmanuel J. Lobato; Bruce L. Adams

[57] ABSTRACT

A liquid crystal composition comprising at least one optically active liquid crystal compound represented by the following general formula:

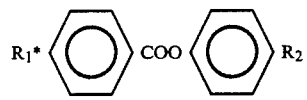

or

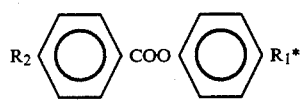

wherein $R_2$ stands for a linear alkyl group and $R_1^*$ stands for an alkoxy or acyloxy group having an asymmetric carbon atom, and at least one optically active liquid crystal compound represented by the following general formula:

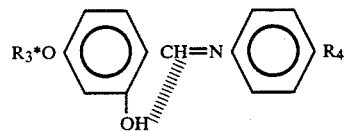

wherein $R_3^*$ stands for an alkyl group having an asymmetric carbon atom and $R_4$ stands for a linear alkyl group.

11 Claims, 6 Drawing Figures

LIQUID CRYSTAL COMPOSITION

BACKGROUND OF THE INVENTION

The present invention relates to a novel ferroelectric liquid crystal composition valuable for an electro-optical element utilizing a response of a ferroelectric smectic liquid crystal to an electric field.

Liquid crystals have been utilized as various electro-optical elements. Since liquid crystals are compact in structure and have a high energy efficiency, they are used as voltage-driven optical valves for displaying in watches or electronic table calculators. Liquid crystal elements practically used at the present time are mainly based on the dielectric arrangement effect of a nematic liquid crystal or cholesteric liquid crystal, and in these liquid crystal elements, because of the dielectric anisotropy, the average molecular long axis is aligned in a specific direction by the applied electric field. Since the coupling force to the applied electric field by this mechanism, that is, the dielectric coupling force, is considerably weak, the electro-optical response speed in these elements is too low in many latent application fields.

Since a liquid crystal element is driven by a low voltage and the power consumption is small, the adaptability to IC is good. Furthermore, the liquid crystal element is compact in structure. Although the liquid crystal element has such excellent properties, it is disadvantageous in that in case of expected application to a display element having many image elements, the response characteristic and the non-linear characteristic of the response are yet insufficient. Accordingly, research and development have been vigorously made on an MOS panel or TFT panel in which a switching element is formed for each image element.

Under these circumstance, Clark et al. developed a liquid crystal element based on a new display principle using the smetic phase, in which the above-mentioned defects of the liquid crystal are eliminated (see U.S. Pat. No. 4,367,924). This liquid crystal element will now be described in brief.

FIG. 1 is a diagram illustrating the smectic C* or H phase. The liquid crystal comprises respective molecule layers 1, and the average direction of the long axis of the molecule in these layers is inclined by an angle $\psi_o$ relative to the direction vertical to the layers. In the thesis entitled "Ferroelectric Liquid Crystals" in Le Journal de Physique, Vol. 36 (March 1975, pages L-69 to L-71), Meyer et al. teach that a smectic C or H liquid crystal composed of optically active molecules generally has an electric dipole density $\vec{P}$ and is ferroelectric. This dipole density $\vec{P}$ is vertical to the inclination direction $\vec{n}$ of the molecules and is parallel to the layer face of the smectic phase. Although what is taught by them is applicable also to the smectic H phase, the viscousness to rotation around the axis vertical to the layer is large in the phase H. The presence of an electric dipole in this chiral smectic gives a much stronger coupling force to the electric field than in the dielectric anisotropy. Furthermore, this coupling force has a polar characteristic in the sense that the preferred direction of $\vec{P}$ is a direction parallel to $\vec{E}$. Accordingly, if the direction of the applied electric field is inverted, the direction of $\vec{P}$ is inverted. Namely, by inversion of the electric field (the angle $2\psi_o$ of this cone will be referred to as "cone angle" hereinafter), as shown in FIG. 2, the direction of $\vec{P}$ can be controlled by the movement of the molecules along the cone. Accordingly, the liquid crystal can be utilized as an electro-optical element by detecting changes of the molecules in the direction of the average long axis by means of two polarizing plates.

In an electro-optical element utilizing the response of this smectic C* or H phase to an electric field, the coupling force between the spontaneous polarization and the electric field is larger on the order of $10^3$ and $10^4$ than the coupling force by the dielectric anisotropy. Accordingly, the response speed of this element is higher than that of a TN type liquid crystal element and, if appropriate orientation control is selected, a memory characteristic can be given to this element. Therefore, it is expected that this electro-optical element will be applied to a high-speed optical shutter or a display device having a large display information quantity.

Various chiral smectic liquid crystals having this ferroelectric characteristic have heretofore been synthesized and investigated. The ferroelectric liquid crystal first synthesized is p-decyloxybenzilidene-p'-amino.2-methylbutyl cynnamate generally called "DOBAMBC". Liquid crystals of this series represented by the following structural formula have been synthesized and investigated as ferroelectric liquid crystals:

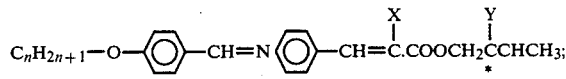

wherein X stands for H, Cl or CN, Y stands for Cl or $C_2H_5$, and the asterisk indicates an asymmetric carbon atom.

Since a liquid crystal of this series shows the chiral smectic phase at a relatively high temperature, this liquid crystal is defective in that the liquid crystal cannot be used at room temperature. Moreover, since this liquid crystal is of the Schiff type, the stability is poor.

As an improved liquid crystal developed from the above-mentioned series, B. I. Ostrovskii et al. [Ferroelectrics, 24, 309 (1980)] and A. Hallsby et al. [Mol. Cryst. Liq. Cryst., Letter 82, 61 (1982)] proposed a chiral smectic liquid crystal compound of the Schiff base type having a hydroxyl group introduced into one benzene ring and a hydrogen bond in the molecule, as represented by the following general formula:

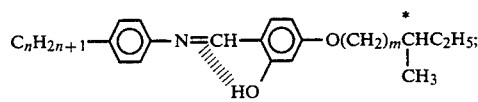

and this compound has attracted attention in the art as a compound showing the smectic C* phase in a broad temperature range including room temperature. Since this compound contains a hydrogen bond in the molecule, it has excellent stability compared to ordinary liquid crystals of the Schiff base type. However, this compound still has insufficient stability at the customarily adopted organic sealing. Furthermore, since the cone angle is much smaller than 45° given an ideal contrast, the contrast is low. Accordingly, this liquid crystal compound has not been put into practical use.

An azoxy type liquid crystal material was reported by P. Keller et al. [Ann. Phys., 139 (1978)]. However, since the applicable temperature range is insufficient and this liquid crystal is a densely yellow compound, this liquid crystal material can hardly be put into practical use.

An ester type liquid crystal which is meritorious in stability among TN type liquid crystal materials is noticeable. In the previously mentioned reference, B. I. Ostrovskii et al. reported that a compound represented by the following formula:

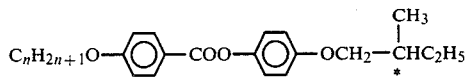

(n = 9, 10)

is a material showing a chiral smectic liquid crystal phase at temperatures relatively close to room temperature. Moreover, G. W. Gray et al. [Mol. Cryst. Liq. Cryst., 37, 189 (1976) and 48, 37 (1978)] reported a biphenyl ester type material showing a chiral smectic liquid crystal phase at relatively high temperatures.

As is apparent from the foregoing description, a liquid crystal material that can be put into practical use has not yet been developed. Under these circumstances, it may be considered that the liquid crystal temperature range will be adjusted by blending as in the case of a nematic liquid crystal. However, in the case of the smectic C* phase, the liquid crystal temperature range is hardly broadened toward a low temperature side by blending, though this broadening is readily achieved in the case of a nematic liquid crystal, and it has been considered difficult to broaden the liquid crystal temperature range so that a liquid phase can be shown at an applicable low temperature.

SUMMARY OF THE INVENTION

It is a primary object of the present invention to provide a liquid crystal composition formed by blending specific liquid crystal compounds, which shows a smectic C* phase even at low temperatures including normal temperature and has an excellent display characteristic that cannot be attained by the respective component compounds alone.

DETAILED DESCRIPTION OF THE INVENTION

The present invention will now be described in detail.

It was found that when an optically active liquid crystal compound represented by the following general formula:

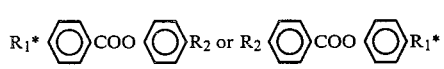

(1)

wherein $R_1*$ stands for an alkoxy or acyloxy group having an asymmetric carbon atom and $R_2$ stands for a linear alkyl group, is blended with an optically active liquid crystal compound represented by the following general formula:

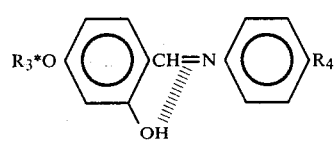

(2)

wherein $R_3*$ stands for an alkyl group having an asymmetric carbon atom and $R_4$ stands for a linear alkyl group, a temperature range where the smectic C* phase appears is broadened to a low temperature side. It was also found that a liquid crystal composition formed by this blending constitutes a ferroelectric liquid crystal display device in which the defect of the ester type compound, that is, a low response speed, and the defect of the liquid crystal compound represented by the formula (2), that is, a small cone angle, are eliminated and which has a good contrast and a high response speed. We have now completed the present invention based on these findings.

From the results of experiments made by us, it was found that in the case of a compound of the type having —O— groups on both side chains, which are represented by the following formula:

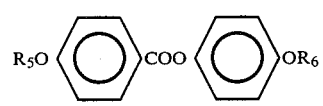

(3)

wherein one of $R_5$ and $R_6$ stands for an alkyl group having an asymmetric carbon atom and the other stands for a linear alkyl group, each of these —O— groups has a strong dipole in the direction of the short axis of the molecules (hereinafter referred to as "lateral direction"), and there are present two of such groups and hence, the mutual action in the lateral direction of the molecules is strengthened. Accordingly, the above compound shows a smectic C* phase in a broad temperature range higher than normal temperature, but because of the strong mutual action in the lateral direction, movement along the cone hardly occurs and when the compound is used for a display device, the response speed is low. In contrast, in a liquid crystal compound in which a group —O— or —COO— having a dipole in the lateral direction is included only in one side chain, as in the ester compound of the present invention, the mutual action in the lateral direction is weakened and the smectic LC characteristic is weakened. It has been found that most liquid crystal compounds of this type show a monotropic smectic C* phase at relatively low temperatures close to normal temperature and these liquid crystal compounds have a higher response speed than those in which groups —O— or —COO— are introduced into both the side chains.

Figure 1:
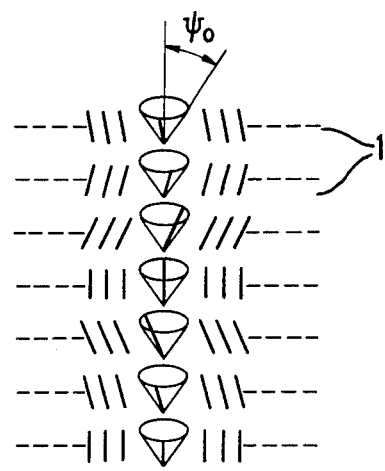
FIG. 1 is a model illustrating the smectic C* phase or H phase.
Figure 2:
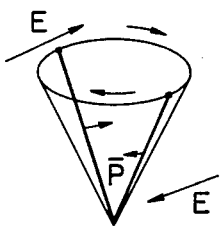
FIG. 2 is a model showing the movement of the liquid crystal molecules of the chiral smectic phase along the cone by an electric field.
Figure 3:
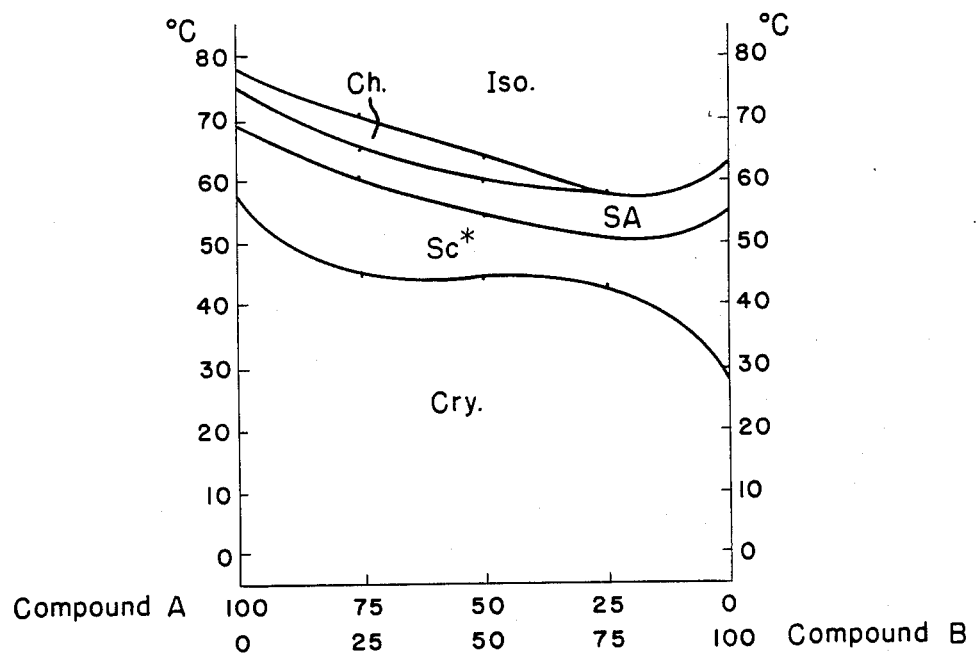
FIGS. 3, 4, 5 and 6 are phase diagrams of a blend of two liquid crystals respectively.

The compound represented by formula (3) has poor compatibility with the liquid crystal compound represented by the formula (2), and even if both compounds are blended, it is difficult to broaden the temperature range showing a smectic C* phase to a low temperature side. This will be readily understood, for example, from FIG. 3 which is a phase diagram of a blend comprising a liquid crystal compound A represented by the following formula:

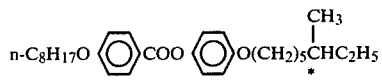

and a liquid crystal compound B represented by the following formula:

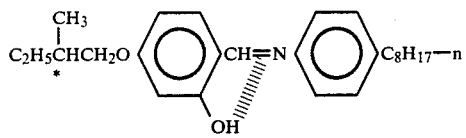

As is seen from the examples given hereinafter, when the liquid crystal compound represented by the formula (1) is blended with the compound of the formula (2), the temperature range bringing about the smectic C* phase can be broadened to a low temperature side.

Moreover, by this blending, the electro-optical characteristics can be improved. More specifically, the ester type liquid crystal compound represented by the formula (1) has a relatively large cone angle and, at a temperature close to the lower limit temperature bringing about the smectic C* phase, this compound has a cone angle close to 45° giving an ideal contrast. However, this compound is defective in that the response speed is very low and the response time is of the order of milliseconds. In contrast, the liquid crystal compound represented by the formula (2) has a high response speed and the response time of this compound is of the order of microseconds, but at a temperature close to the lower limit temperature bringing about the smectic C* phase, the cone angle of the compound is as small as 30° to 35° and the compound is defective in that only a low contrast can be obtained. If these compounds are blended together, the merits of both of the compounds can be exerted, that is, a large cone angle and a high response speed can be obtained, and in the resulting liquid crystal composition, the demerits of both of the compounds, that is, a low response speed and a small cone angle, can be eliminated.

The present invention will now be described in detail with reference to the following examples.

EXAMPLE 1

Figure 4:
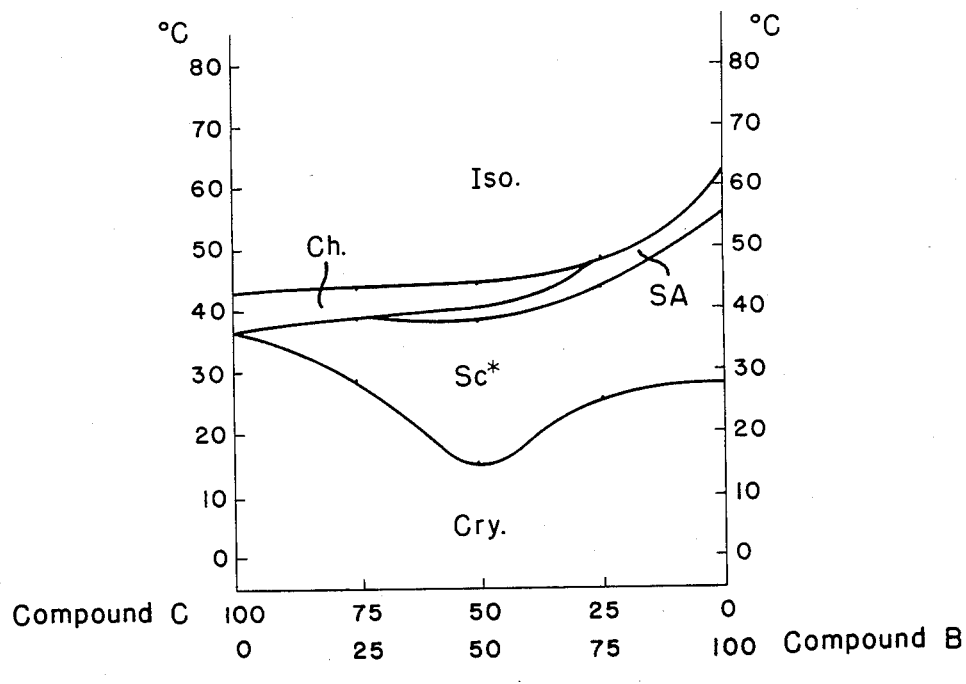

A phase diagram of a blend comprising an ester type liquid crystal (compound C) of the following formula:

and a Schiff base type liquid crystal (compound B) having a hydrogen bond in the molecule, which is represented by the following formula:

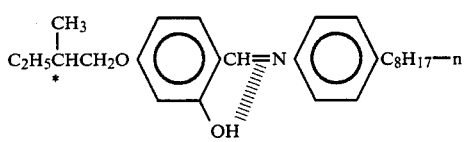

is shown in FIG. 4.

The compound C shows the following phase transition:

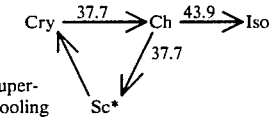

However, since the data obtained during elevation of the temperature are plotted, the compound C does not show the smectic C* phase in the phase diagram.

Characteristics of these crystals are shown in Table 1 (with respect to the compound C, data sampled in a super-cooled state are shown).

TABLE 1

|  | Measurement Temperature | Cone Angle | Contrast | Response Time |
|---|---|---|---|---|
| Compound C | 30° C. | 44° | 14.0 | 1.0 1.0 mS |
| Compound B | 30° C. | 32° | 6.0 | 300 μS |
| C + B (1:1) | 25° C. | 41° | 12.8 | 450 μS |

The foregoing data were collected under a crossed nicol in a state where the liquid crystal was inserted between substrates monoaxially oriented by PVA rubbing while adjusting in liquid crystal layer thickness to 3 μm and a voltage of ±10 V was applied.

As is seen from FIG. 4, by blending the compound C with the compound B, the smectic C* phase could be broadened to a low temperature side, as compared with the case where the compound C or B is used alone. The liquid crystal composition formed by blending the compounds C and B at a ratio of 1:1 showed a smectic C* phase in a temperature range of from 15.0° to 38.0° C. during the elevation of the temperature, and the smectic C* phase could be maintained stably in a super-cooled state for a long time. Moreover, as shown in Table 1, in connection with the display characteristics, this liquid crystal composition was improved in that the defects of both compounds, that is, the low response speed of compound C and a low contrast of compound B, were eliminated.

EXAMPLE 2

Figure 5:
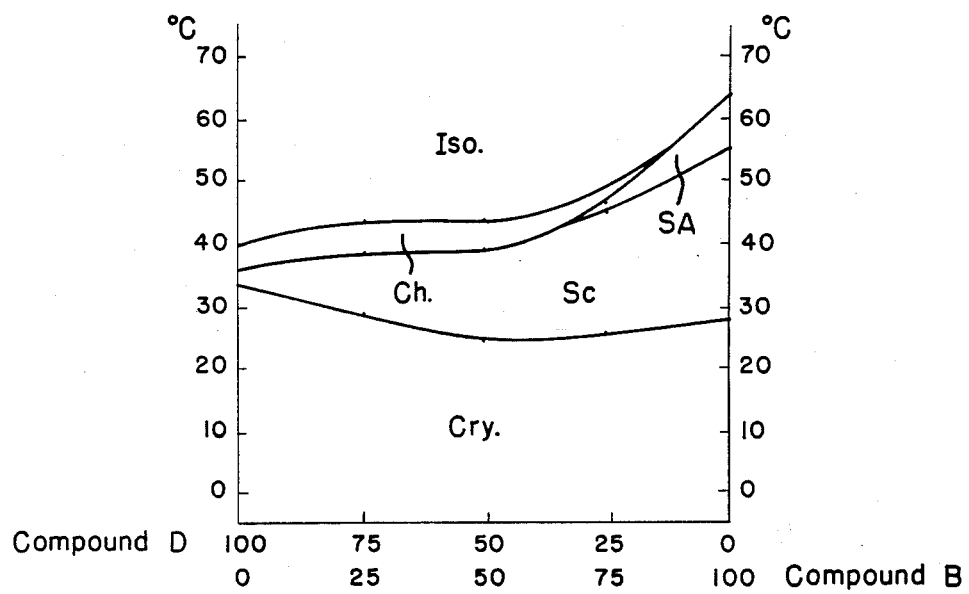

A phase diagram of a blend comprising an ester type liquid crystal (compound D) of the following formula:

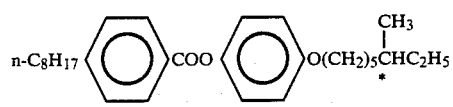

and a Schiff base type liquid crystal having a hydrogen bond in the molecule (compound B), represented by the following formula:

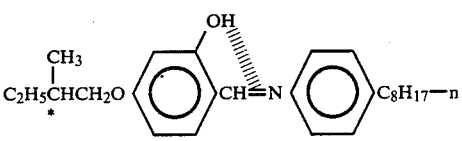

is shown in FIG. 5.

The compound D shows the following phase transition:

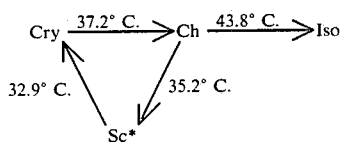

Figure 6:
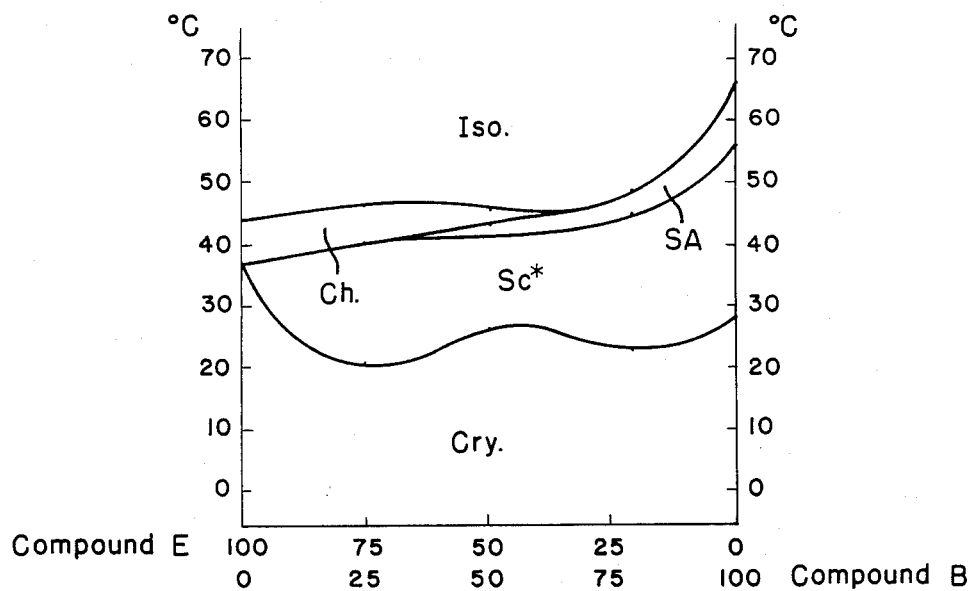

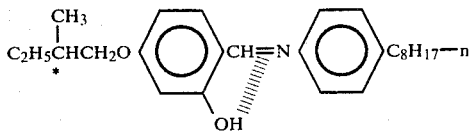

is shown in FIG. 6.

The characteristics of these liquid crystals are shown in Table 3. Incidentally, the data of compound E are those sampled in a super-cooled state.

TABLE 3

| | Measurement Temperature | Cone Angle | Contrast | Response Time |
|---|---|---|---|---|
| Compound E | 30° C. | 40° | 10.5 | 700 μS |
| Compound B | 30° C. | 32° | 6.0 | 300 μS |
| E + B (1:3) | 30° C. | 39° | 12.5 | 350 μS |

As is apparent from FIG. 6, by blending the compounds E and B, the smectic C* phase could be broadened to a low temperature side, though slightly, as compared with the case where the compound E or B is used alone. A liquid crystal composition comprising the compounds E and B at a ratio of 1:3 showed a specific C* phase at 24.5° to 38.6° C. during the elevation of the temperature, and in a super-cooled state, the smectic C* phase was stable for a long time.

In Table 3, the compound E has a higher contrast than the composition of E+B (1:3) though the cone angle is smaller. This is because the composition of E+B (3:1) has a higher monoaxial orientability by the PVA rubbing treatment than compound E, and this is due to the influence of compound B. As is seen from the foregoing results, a liquid crystal composition having excellent display characteristics can be obtained by blending the compounds E and B.

EXAMPLE 4

A liquid crystal composition formed by blending the following compounds showed a smectic C* phase at 3° to 54° C. during the elevation of the temperature and the smectic C* phase could be maintained stably for a long time in a super-cooled state.

Since the data collected during the elevation of the temperature are plotted in FIG. 5, the compound D does not show the smectic C* phase in the phase diagram.

Characteristics of these liquid crystals are shown in Table 2 (with respect to the compound D, data sampled in a super-cooled state are shown).

TABLE 2

| | Measurement Temperature | Cone Angle | Contrast | Response Time |
|---|---|---|---|---|
| Compound D | 34° C. | 40° | 9.5 | 1.7 mS |
| Compound B | 30° C. | 32° | 6.0 | 300 μS |
| D + B (3:1) | 25° C. | 40° | 11.5 | 700 μS |

The foregoing data were collected under a crossed nicol in a state where the liquid crystal was inserted between substrates monoaxially oriented by PVA rubbing while adjusting the liquid crystal layer thickness to 3 μm and a voltage of ±10 V was applied.

As is apparent from FIG. 5, by blending the compounds D and B, the smectic C* phase could be broadened to a low temperature side, as compared with the case where the compound D or B is used alone. A liquid crystal composition formed by blending the compounds D and B at a ratio of 3:1 showed a smectic C* phase at 20.0° to 39.8° C. during the elevation of the temperature, and in a super-cooled state, the smectic C* phase was stable for a long time.

In Table 2, the cone angle of the composition of D+B (3:1) is the same as that of compound D and is 40°, but the composition has a higher contrast. This is because compound D is relatively poor in monoaxial orientability by the PVA rubbing treatment and in the liquid crystal composition formed by blending, the monoaxial orientability by the PVA rubbing treatment is improved over that of compound D by influence of the compound B. In connection with display characteristics, the low response speed of compound D and the low contrast of compound B were improved in the liquid crystal composition obtained by blending.

EXAMPLE 3

A phase diagram of a blend comprising an ester type liquid crystal (compound E) of the following formula:

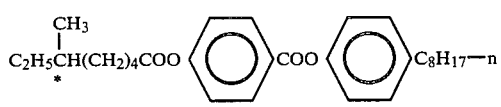

and a Schiff base type liquid crystal having a hydrogen bond in the molecule (compound B), represented by the following formula:

When the display characteristics of this liquid crystal composition were measured after inserting the liquid crystal composition between substrates subjected to the PVA rubbing treatment so that the liquid crystal layer thickness was 3.0 μm, it was found that the response time and contrast at 25° C. were 350 μS and 15.0, respectively.

In the foregoing examples, only specific compounds selected from the compounds represented by the formulae (1) and (2) are illustrated. However, by various experiments, it has been confirmed that by blending an ester type compound of the formula (1) with a Schiff base type liquid crystal of the formula (2) having a hydrogen bond in the molecule, the smectic C* phase can be broadened to a low temperature side, and the defects of the respective compounds, that is, a low response speed, and a small cone angle and a low contrast, can be eliminated in the resulting liquid crystal composition. Furthermore, when the Schiff base type liquid crystal having a hydrogen bond in the molecule is compared with an ordinary Schiff base type liquid crystal, deterioration by the hydrolysis is reduced in the former liquid crystal.

As is apparent from the foregoing description, according to the present invention, it is possible to provide a ferroelectric liquid crystal composition showing a smectic C* phase in a broad temperature range including normal temperature, and the present invention makes great contributions to practical utilization of ferroelectric liquid crystal display devices.

What is claimed is:

1. A liquid crystal composition comprising at least one optically active liquid crystal compound represented by the formula:

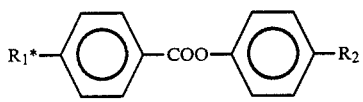

or

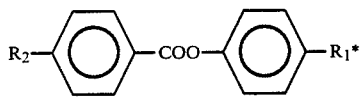

and at least one optically active liquid crystal compound represented by the formula:

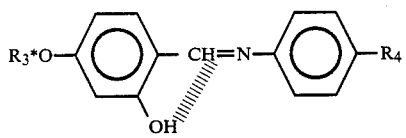

wherein $R_1^*$ is an alkoxy or acyloxy group having an asymmetric carbon atom of the formula:

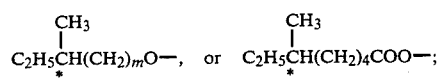

$R_2$ is a linear alkyl group which is $C_8H_{17}$ or $C_{11}H_{23}$; $R_3^*$ is an alkyl group having an asymmetric carbon atom of the formula:

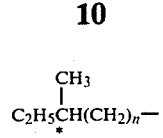

$R_4$ is a linear alkyl group $C_8H_{17}$; and
m and n are each integers of 1 to 5.

2. A liquid crystal composition as claimed in claim 1, wherein $R_1^*$ is

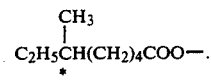

3. A liquid crystal composition as claimed in claim 2, wherein

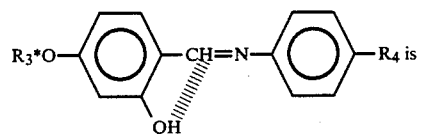 is

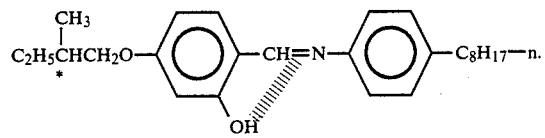

4. The liquid crystal composition as claimed in claim 1, wherein $R_1^*$ is:

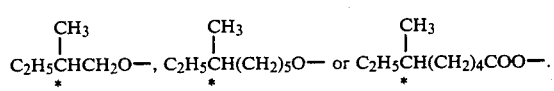

5. The liquid crystal composition as claimed in claim 1, where $R_3^*$ is

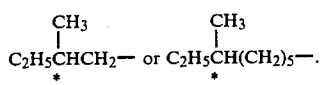

6. The liquid crystal composition as claimed in claim 1 comprising an ester type liquid crystal of the formula:

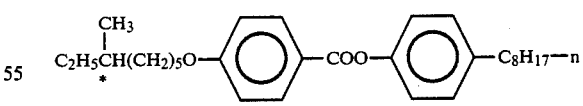

and a Schiff base type liquid crystal having a hydrogen bond in the molecule, which is represented by the formula:

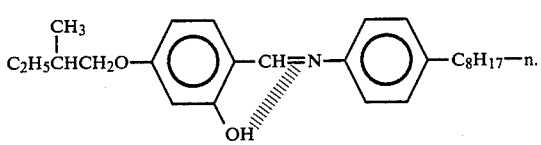

7. The liquid crystal composition as claimed in claim 1 comprising an ester type liquid crystal of the formula:

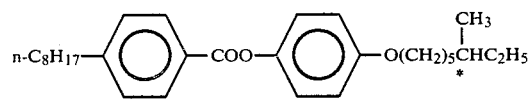

and a Schiff base type liquid crystal having a hydrogen bond in the molecule represented by the formula:

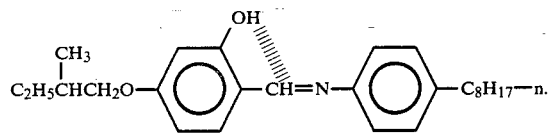

8. The liquid crystal composition as claimed in claim 1 comprising an ester type liquid crystal of the formula:

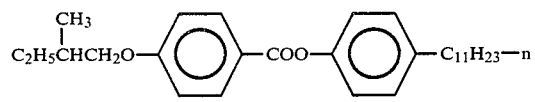

and a Schiff base type liquid crystal having a hydrogen bond in the molecule, which is represented by the formula:

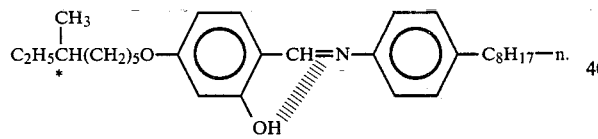

9. The liquid crystal composition as claimed in claim 1 comprising an ester type liquid crystal of the formula:

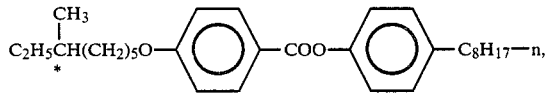

and a Schiff base type liquid crystal having a hydrogen bond in the molecule represented by the formula:

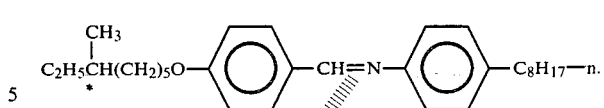

10. The liquid crystal composition as claimed in claim 1 comprising an ester type liquid crystal of the formula:

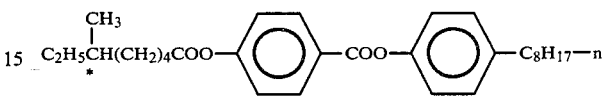

and a Schiff base type liquid crystal having a hydrogen bond in the molecule represented by the formula:

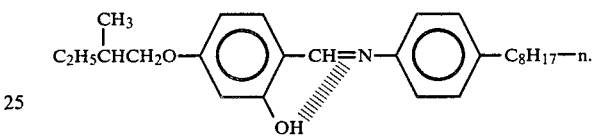

11. The liquid crystal composition as claimed in claim 1 comprising two ester type and two Schiff base type liquid crystals of the formulas:

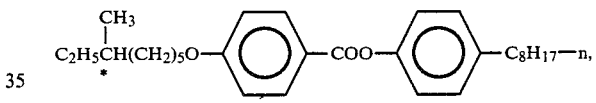

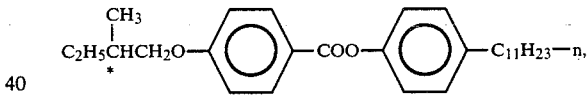

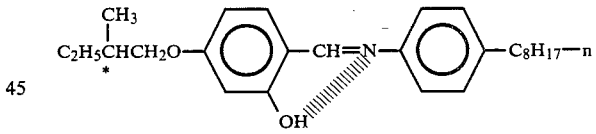

and

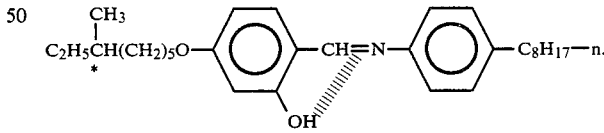

* * * * *